Aug. 15, 1939. W. OWEN 2,169,739
APPARATUS FOR MANIPULATING GLASS PLATES
Filed Sept. 8, 1937 3 Sheets-Sheet 1

INVENTOR.
WILLIAM OWEN
BY Bradley T Bee
ATTORNEYS.

Aug. 15, 1939  W. OWEN  2,169,739
APPARATUS FOR MANIPULATING GLASS PLATES
Filed Sept. 8, 1937  3 Sheets-Sheet 3

INVENTOR.
WILLIAM OWEN
BY Bradley Bee
ATTORNEYS.

Patented Aug. 15, 1939

2,169,739

UNITED STATES PATENT OFFICE 2,169,739

APPARATUS FOR MANIPULATING GLASS PLATES

William Owen, Pittsburgh, Pa., assignor to Pittsburgh Plate Glass Company, Allegheny County, Pa., a corporation of Pennsylvania Application September 8, 1937, Serial No. 162,909

7 Claims. (Cl. 214—87)

The present invention relates to apparatus for inverting or turning over and transferring plates of glass and it has particular relation to the provision of apparatus for inverting plates of glass while shifting them from cars on one track to cars on another track in a grinding and polishing system.

One object of the invention is to provide an apparatus which will effect the transfer and turnover of plates of glass mechanically with a minimum risk of breakage.

A second object of the invention is to provide an apparatus of the foregoing type which will effect the inversion and transfer of glass plates rapidly and with a minimum number of different movements.

These and other objects will be apparent from consideration of the following specification and the accompanying drawings.

In the drawings, Fig. 1 is a view taken transversely of a grinding and polishing system showing the mechanism for transferring and turning the plates of glass in elevation.

Figure 1:
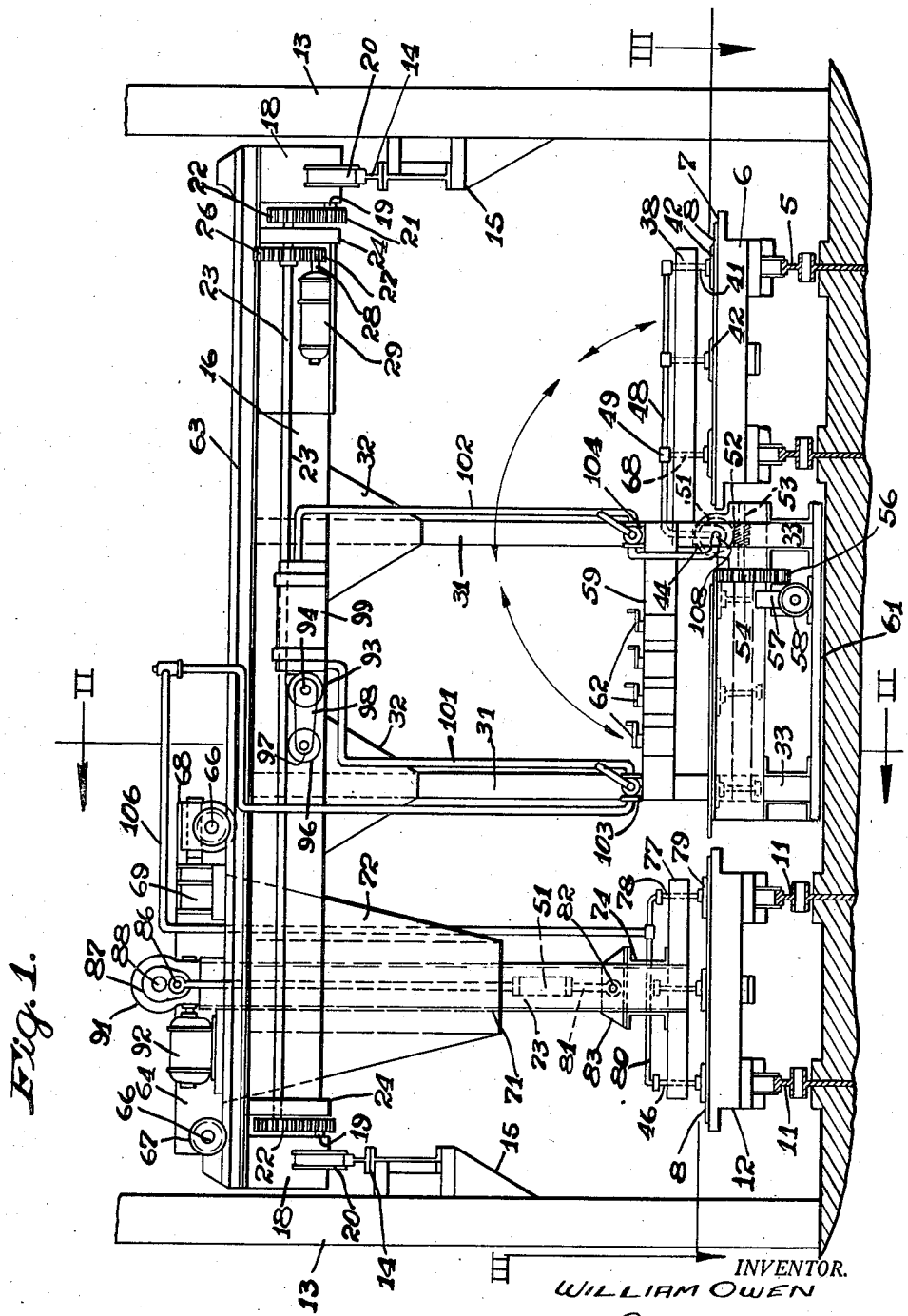

In the drawings like numerals refer to like parts. In the grinding and polishing of glass plates, the plates are customarily cemented to a movable table upon which they are carried under suitable grinding and polishing instrumentalities that grind away the elevations and then polish out the scratches produced in grinding. The plates are then loosened from the table, inverted and again cemented down, after which the other surface is ground and polished.

A suitable system for conducting these operations embodies a work track along which the grinding and polishing devices are disposed in a line and a series of cars, the tops of which constitute the supporting tables for the glass plates, are disposed upon the tracks. These cars are coupled together and are moved continuously along the track from machine to machine until one surface is finished. Customarily a return track for the cars is also provided in parallelism to the first track. And the inversion of a glass plate is effected by transferring it across from a loaded car on the return track to an empty car on the other work track, the shift being accompanied by the necessary rotation of the plate about a horizontal axis, in order to invert it. A system of this type is disclosed in Fox Patent 1,554,804.

Manifestly, the simultaneous rotation and shifting of the large heavy plates of frangible glass is a difficult operation and requires great care to obviate breakage. In a continuous system such as described it is also rendered more difficult because the line must be maintained in continuous operation and usually the plates are laid while the cars are moving. Often much time is lost in transferring and turning operations and as a result operations along the entire line are seriously slowed up.

The present invention embodies means for mechanically shifting and turning the plates with minimum loss of time. Briefly stated, a main feature of the invention involves the provision of a travelling crane that carries a frame that will invert or turn plates of glass over and simultaneously will pick them from or deposit them upon cars on one track, and a second or transfer frame for transferring plates between the cars on the second track and the first frame. The first-mentioned frame is designed to rotate through an angle of 180° and carries upon one side vacuum cups designed to hold a plate of glass by a single side throughout the arc of swing of the frame. This frame is so disposed that when at one extreme of its arc of movement the vacuum cups will engage plates of glass upon cars on one of the tracks. In the other extreme position it holds the plates with their free faces uppermost. Transfer of the plates of glass between the cars on the other track and the turnover frame is then effected by the pick-up frame which is provided upon its lower side with vacuum cups for holding the glass.

Referring to the drawings in detail, a system embodying the invention comprises a return trackway 5, upon which are disposed cars 6, having flat tops 7, that carry plates of glass 8, that have been ground and polished upon one side. Short pins 9 in the tops of the cars engage the edges of the glass plates and assist in holding the latter from displacement during grinding and polishing operations. Upon a second trackway 11 which passes under suitable grinding and polishing machines (not shown) are disposed cars 12 identical with cars 6 that carry the plates during the second grinding and polishing operation. The transfer and inversion of the glass plates is effected by means of a mechanism that includes spaced supporting columns 13 which stand upon opposite sides of tracks 5 and 11 and which carry elevated rails 14, which are disposed in parallelism to the tracks, upon brackets 15. A travelling crane or bridge 16 is mounted to move along the rails and includes spaced cross beams 17 having brackets 18 that constitute bearings for shafts 19 of the flanged rollers 20, that carry the crane upon rails 14. For purposes of actuating the crane along rails 14 gears 21 are also keyed upon shafts 19 and are engaged by and driven in unison by gears 22 keyed upon the extremities of a shaft 23, which extends between and is journaled in a second set of bearings 24 in proximity to bearings 18. A driving gear 26 is likewise keyed upon shaft 23 adjacent to one bearing and in turn is driven by a gear 27 upon the shaft 28 of an electrical motor 29.

Simultaneous inversion of and removal of plates of glass from cars 6 is accomplished by a construction which includes dependent supports 31 secured at their upper extremities upon beams 17 and braced by gussets 32. Longitudinal beams 33 and cross members 34 interconnect the lower ends of the supports to provide a rigid framework. Spaced bars 36 suitably covered with felt pads 37 are disposed across beams 33 at right angles to trackways 5 and 11 and provide a platform for temporary reception of plates of glass from cars 6. A turnover mechanism for effecting transfer of the plates across the space between cars 6 and bars 36 and simultaneously inverting the plates comprises a turnover frame 38, consisting of bars 39 slidably receiving stems 41 of vacuum cups 42 for adhesion to the plates of glass. The bars are disposed in one position to rest in the spaces between bars 36 with the cups uppermost to engage the undersurface of a plate upon the latter. Bars 39 are also rigidly secured at their extremities by means of bolts 43 to brackets 44 which are rigidly secured upon a hollow shaft 46 journaled in bearings 47 upon beam 33 adjacent to track 5. A conduit 48 having branches 49 connected to stems 41 and constituting a manifold connects cups 42 with the shaft. This shaft is designed to rotate through an arc of 180° to position in which the cups engage and adhere to plates of glass upon cars 6.

Rotation of the shaft is effected by means of a worm wheel 51 keyed upon the shaft and engaging a worm 52 upon a shaft 53, which is suitably journaled in bearings (not shown). The shaft is also provided with a gear 54 which engages a gear 56 upon the shaft (not shown) of a speed-reducing mechanism 57. The latter rests upon cross member 34 and is actuated by a motor 58.

A cross bar 59 is disposed upon supports 31 transversely of tracks 5 and 11 at convenient height above an operator's platform 61, which is secured to beams 33 rearwardly of turnover frame 38. Bar 59 constitutes a support for manually operated electrical controllers 62 which are suitably wired into and control the flow of current, in the circuits of motors 29 and 58, as well as certain motors for actuating the transfer mechanism which will now be described:

Beams 17 of the crane or traveling bridge are provided upon their upper sides with rails 63 that extend transversely of the tracks 5 and 11 and constitute trackways for a transversely reciprocable pick-up device for lifting and transferring plates of glass from bars 36 to cars 12. This device includes a carriage or frame 64 having transverse axles 66 with flanged wheels 67 keyed thereupon and rolling upon the rails 63.

A speed reducing mechanism 68 (Fig. 1) is geared to one of the axles and is actuated by a motor 69 upon the frame to propel the device transversely of tracks 5 and 11.

Dependent guides 71 braced by webs 72 are also secured to the frame 64 and a reciprocable crossframe comprising vertical bars 73 slidably disposed in the guides and a cross bar 74 rigidly connecting bars 73 is slidably disposed between the guides. Bars 76 secured transversely of the cross bar and constituting a lifting frame 77 are bored slidably to receive the hollow stems 78 of vacuum cups 79, which engage and by reason of their suction lift the glass plates upon the cars 12. A manifold comprising conduits 80 connected to stems 78 constitutes means for evacuating the cups.

Figure 2:
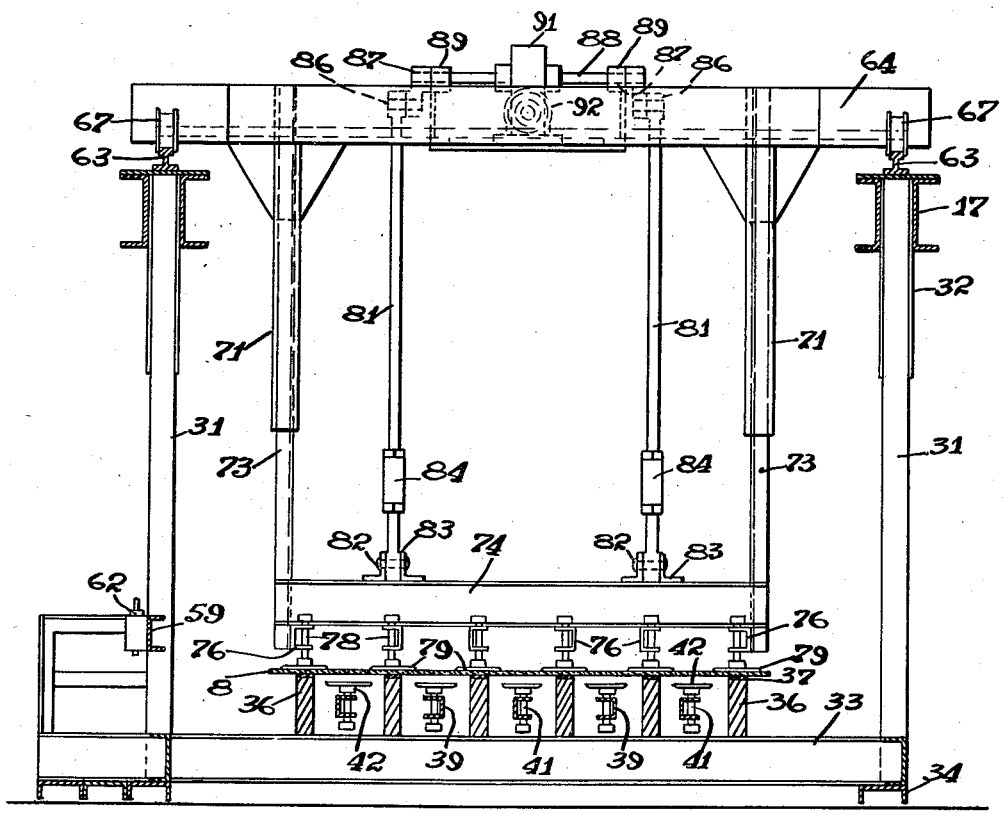
Fig. 2 is a cross sectional view taken substantially upon the line II—II of Fig. 1.
Figure 3:
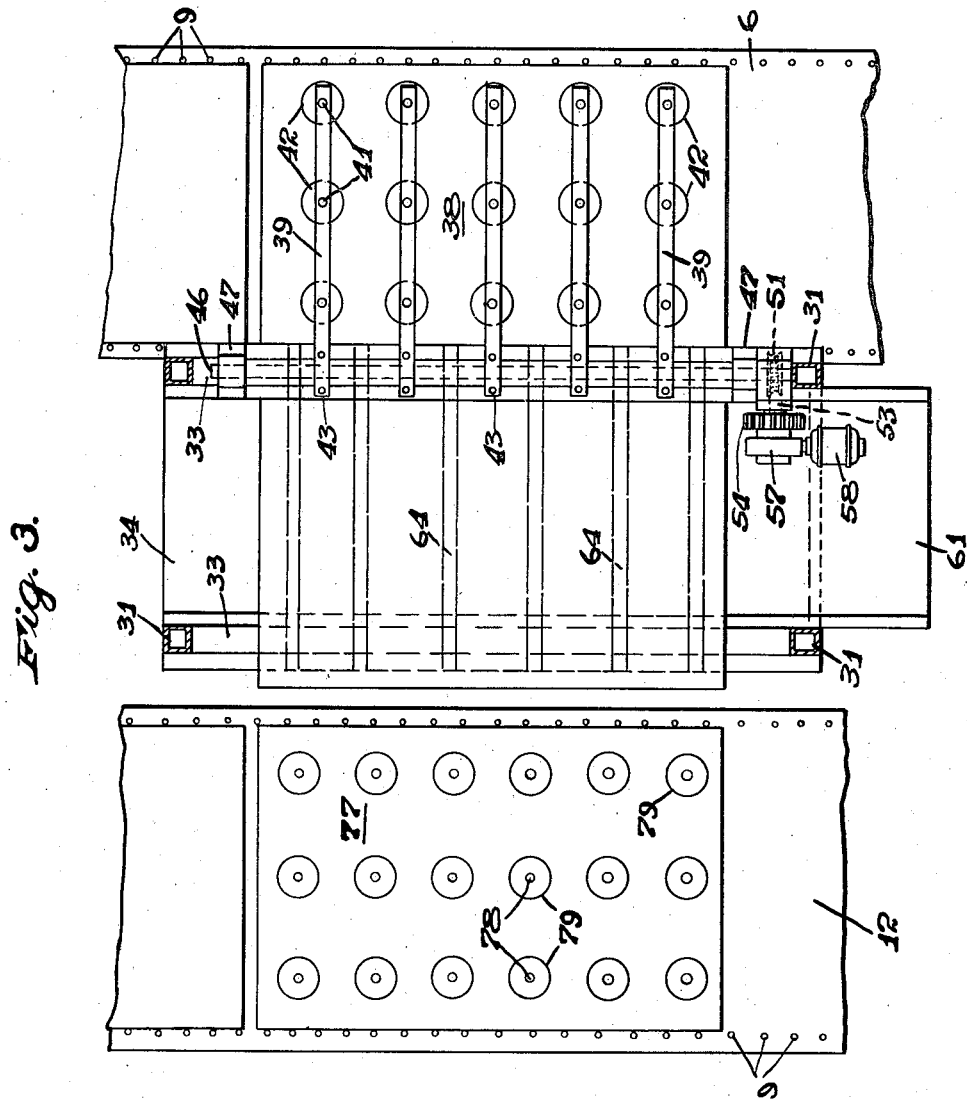
Fig. 3 is a cross sectional view taken substantially upon the line III—III of Fig. 1.

Mechanism for raising and lowering the crossframe to elevate or lower glass plates engaged by the suction cups, includes pitman rods 81 hingedly connected by pins 82 to brackets 83 upon bar 74. Turnbuckles 84 intermediate the length of the pitman rods constitute means for adjusting the length thereof to meet given operating conditions. The pitman rods at their upper extremities are journaled upon the pins 86 of crank-arms 87 which are secured upon the extremities of a crankshaft 88 having bearings 89 (shown in Fig. 2) upon frame 64. The shaft is actuated by a speed reducing gear 91 driven by motor 92 also mounted upon frame 64.

Suitable means for generating a vacuum for cups 42 and 79 comprises a vacuum pump 93 having a pulley 94, mounted upon beam 17. A motor 96 having a pulley 97 is also mounted upon the beam adjacent to the pump and a belt 98 trained about the pulleys constitutes means for transmitting power from the motor to the pump. The pump is connected to a cylinder 99 likewise mounted upon beam 17, that equalizes the degree of vacuum maintained in the system when sudden loads are placed upon it. Conduits 101 and 102 from cylinder 99 are provided with hand-controlled valves 103 and 104 which are secured to the supports 31 in position convenient for the operator upon platform 61. Conduit 101 is connected by a flexible conduit 106 with conduit 80 leading to vacuum cups 79 in such manner as to admit of free movement of the carriage 64 upon rails 63. Conduit 102 is connected by a flexible or swivel coupling 108 with hollow shaft 46 leading to vacuum cups 42.

In the operation of the foregoing apparatus it will be assumed that a plate of glass is to be removed from car 6 on return track 5, turned over and relaid upon car 12 on work track 11. This may be accomplished either while car 6 is standing still or moving. Assuming that the crane or travelling bridge 16 has been actuated by motor 29 to bring the frame 38 into alignment with car 6, and the pick-up frame 77 is to the extreme left, the motor 58 is operated to rotate the turnover frame to a position above the car 6 and to contact cups 42 with glass plate 8. Upon opening of valve 104, vacuum is generated in the cups and the plate is caused to adhere to the latter. Upon reverse rotation of turnover frame 38, the plate is inverted and swung over upon bars 36 and the vacuum in the cups is released.

Motor 69 is subsequently actuated with the pick-up frame in elevated position, to a position over the glass plate. When motor 92 is actuated, crankshaft 88 is rotated to lower the frame to bring cups 79 into contact with the plate. Valve 103 is then operated to exhaust the cups 79 for purposes of gripping the plate. Subsequently motor 92 is operated to elevate the frame 77 and the glass plate carried thereby. Motor 69 is reversed to move the pick-up frame over track 11 and motor 29 is operated to bring the frame 77 into register with and into synchronous movement with car 12 which preferably has preliminarily received a coat of plaster upon its top. Motor 92 is again operated to lower the frame 77 until the glass plate is brought into contact with the top of the car. Lastly, the vacuum in cups 79 is released and the frame 77 is moved away from the freshly laid plate. The cycle may then be repeated to invert, transfer and lay additional plates.

Manifestly the operation of the apparatus could be reversed, frame 77 being employed to pick up plates of glass, deposit them upon the bars 36 for inversion and relaying upon cars 6 by turnover frame 38. Bars 36 may be deleted and the pick-up frame employed to take plates of glass directly from cups 79 when the latter are inverted.

The apparatus may be employed for picking up and laying plates of glass from a stack or from a lehr or other glass treating apparatus either with or without turnover.

By reason of the fact that the turnover frame functions both to invert plates of glass and to pick them up for transfer, to the grinding and polishing line, the time cycle is substantially reduced from that usually required, because in conventional apparatus pick up and transfer of the plates to the turnover frame involves a separate operation.

Although only a preferred form of the invention has been shown and described, it will be apparent that numerous modifications may be made therein without departure from the spirit of the invention or the scope of the appended claims.

What I claim is:

1. Apparatus for manipulating glass plates comprising a pair of parallel trackways, cars upon the trackways, a bridge disposed over the trackways above the cars, a support dependent from the bridge between the trackways, a turnover frame having vacuum cups for holding the glass plates upon one side, said turnover frame being mounted to rotate about an axis parallel to the trackways from a position in which the cups are faced downward and engage the plates upon a car upon a track to a position in which the cups are faced upward and the frame lies intermediate the trackways, a pick-up frame having downwardly facing vacuum cups and means to move the pick-up frame from a position over the turnover frame when the latter is disposed with the cups facing upward, to a position over a car upon the second track and means to raise and lower the pick-up frame.

2. Apparatus for manipulating plates of glass comprising a pair of parallel trackways, cars for carrying plates of glass upon the trackways, elevated rails disposed parallel to the trackways, a travelling bridge mounted upon the rails transversely of the trackways, a dependent support mounted upon the bridge spaced horizontal bars mounted upon the support transversely of the trackway, a turnover frame comprising bars spaced to lie between the first-mentioned bars, vacuum cups secured upon one face of the turnover frame, the frame being journaled to rotate about an axis parallel to the trackways from a position in which the cups contact with a glass plate upon a car on one trackway to a position in which the cups are below the level of the horizontal bars, a pick-up frame mounted upon the bridge and means to move it transversely of the trackways from a position over the horizontal bars to a position over a car on the second trackway, downwardly facing vacuum cups upon the frame and means to raise and lower the frame.

3. Plate glass turnover and transfer apparatus for grinding and polishing system including parallel tracks carrying cars upon which glass plates are ground and polished, comprising a crane mounted above the tracks for movement longitudinally thereof, a vacuum lift frame supported from said crane and movable longitudinally thereof from a position above one track to a position intermediate said tracks, a second vacuum frame supported from said crane adapted to rotate about a horizontal axis through an arc of 180 degrees from a position intermediate of said tracks to a position directly above the second track, vacuum cups carried by both frames to securely grip a glass plate and means for controlling the movement of the crane and vacuum frames.

4. Plate glass turnover and transfer apparatus for a grinding and polishing system including parallel tracks carrying cars upon which glass plates are ground and polished, comprising a crane mounted above the tracks for movement longitudinally thereof, means for correlating the movement of the crane and the cars passing therebeneath, a carriage mounted upon said crane and movable transversely thereof, a vacuum lift frame supported from the carriage adapted for vertical movement, means for moving the carriage from a position over one track to a position intermediate said tracks, a second vacuum frame supported from said crane adapted to rotate about a horizontal axis from a position intermediate the tracks to a position directly above the second track, reversible means for controlling the rotation of this second frame, and vacuum cups carried by both frames to releasably grip a glass plate while it is being moved.

5. Apparatus for manipulating sheets of glass comprising a pair of parallel trackways, cars upon the trackways for carrying the sheets, pick-up and turnover mechanism for the sheets comprising spaced supports for a sheet of glass, a turnover frame comprising bars spaced to alternate with the spaced supports, said frame being provided upon one side with vacuum cups, and being hinged to rotate about an axis parallel to the trackways from a position over a car upon one trackway and with the cups in contact with plate upon the car to a position in which the cups are disposed between the supports and the plate rests upon the latter.

6. A structure as defined in claim 5 in which means is provided to pick up a plate of glass from the supports and deposit it upon a car on the second trackway.

7. Apparatus for manipulating plates of glass comprising two parallel spaced trackways for cars carrying glass plates through a grinding and polishing operation, a bridge mounted transversely of the trackways and carried upon rails positioned parallel to the trackways, a frame dependent from the bridge comprising spaced horizontal supports adapted to receive a plate of glass, a turnover frame carried by the bridge consisting of spaced arms disposed to register with the spaces between the supports, each of the arms carrying vacuum cups, means to rotate and transport the frame from a position over one of the trackways with the vacuum cups in contact with a plate of glass carried by one of the cars moving along said trackway through an arc of 180 degrees to a position in which the glass plate engages and rests upon the supporting frame dependent from the bridge, and a vacuum pick-up frame reciprocable along the bridge from a position over the glass supporting frame to a position over a car upon the second trackway to which the glass plate is to be transferred, and means for moving the vacuum pick-up frame vertically.

WILLIAM OWEN.